(No Model.)
R. M. ATWATER.
APPARATUS FOR CUTTING THE SCALES ON GLASS MEASURING VESSELS.
No. 273,795. Patented Mar. 13, 1883.
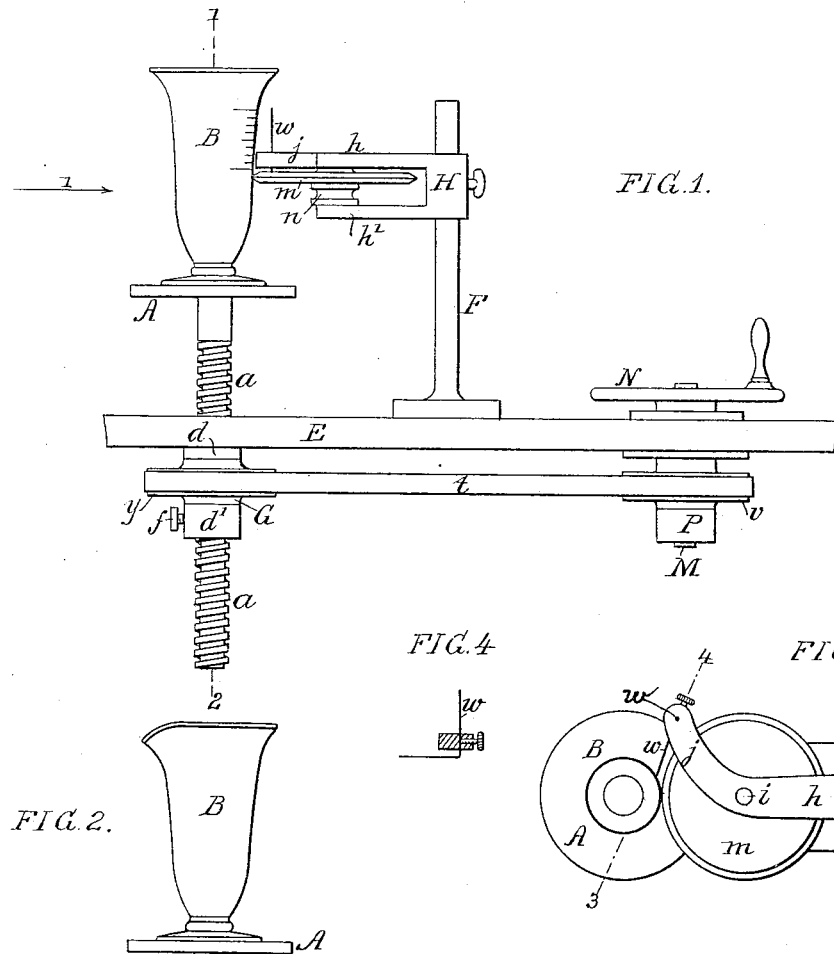
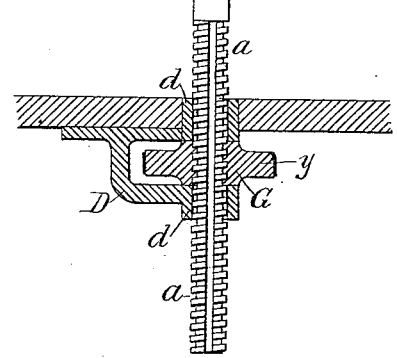
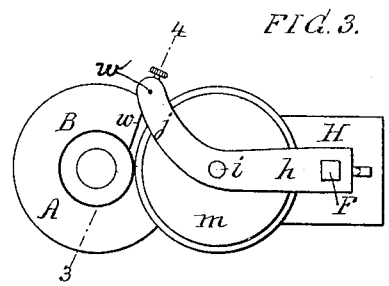
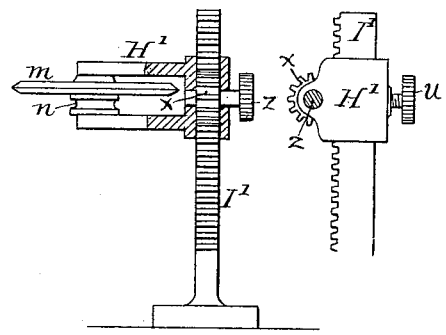
WITNESSES:
James F. Tobin
Harry Drury
INVENTOR:
Richard M. Atwater
by his Attorneys
Howson & Sons

UNITED STATES PATENT OFFICE.

RICHARD M. ATWATER, OF MILLVILLE, NEW JERSEY, ASSIGNOR OF ONE-HALF TO WHITALL, TATUM & CO., OF PHILADELPHIA, PENNSYLVANIA.

APPARATUS FOR CUTTING THE SCALES ON GLASS MEASURING-VESSELS.

SPECIFICATION forming part of Letters Patent No. 273,795, dated March 13, 1883.

Application filed February 9, 1883. (No model.)

To all whom it may concern:

Be it known that I, RICHARD M. ATWATER, a citizen of the United States, and a resident of Millville, Cumberland county, New Jersey, have invented certain Improvements in Apparatus for Cutting the Scales on Glass Measuring-Vessels, of which the following is a specification.

My invention consists of mechanism, fully described hereinafter, for accurately engraving on glass measuring-vessels the necessary graduation-marks after the proper positions of such marks have been determined by scratches made by a diamond.

In the accompanying drawings, Figure 1 is a side view of the apparatus; Fig. 2, a vertical section on the line 1 2, looking in the direction of the arrow, Fig. 1; Fig. 3, a plan view; Fig. 4, a vertical section on the line 3 4, and Figs. 5 and 6 views illustrating a modification of my invention.

A is a vertically-adjustable platform, on which is placed the glass measure B, scratches determining the proper position of the graduation-marks having been made on the measure by a diamond, and the platform having a true face which must always be in a horizontal plane. For the ready vertical adjustment of this platform I prefer the devices shown in the drawings, which consist of a threaded stem, a, attached to or forming a part of the said platform, a guiding bracket or hanger, D, secured to a table or bench, E, a nut, G, on which is formed a pulley, y, a driving-shaft, M, provided with a suitable handle or hand-wheel, N, and having its bearings in a bracket, P, secured to the table, and provided with a pulley, v, round which and round the pulley on the nut passes a belt, t.

The threaded stem a of the platform is arranged to slide freely in the guides d d' of the bracket D, and is prevented from turning therein by a set-screw, f, the end of which enters a groove in the threaded stem; or a suitable key adapted to the groove in the stem and to a slot in one of the guides may be used in place of the set-screw.

The nut G is confined vertically between the two guides d d' of the bracket D, the nut being threaded internally to accord with the thread of the stem a.

Other devices for vertically adjusting the platform A will readily suggest themselves to expert mechanics; but I prefer the above-described mechanism, as the left hand of the operator will always be at liberty to manipulate the vessel B while the necessary adjustments of the table are effected by the right hand applied to the hand-wheel or handle N.

A stand, F, is secured to the table E, and to this stand is secured a bracket, H, having two arms, h h', in which the spindle i of the engraving-wheel m has its bearings, the spindle being provided with a pulley, n, round which passes a band from a pulley on any neighboring driving-shaft. The engraving-wheel may be of any material or composition capable of cutting glass.

The arm h of the bracket H has an extension, j, through a hole in which is passed a needle, w, secured by a set-screw, the lower portion of the needle being bent, so that the vessel B on the platform A can be brought to bear against the sharp point of the said bent portion of the needle, which must be so adjusted vertically that the point shall be in the same horizontal plane as the cutting-edge of the engraving-wheel.

The operator, seated at the table, pushes the vessel B with his left hand lightly against the point of the needle, which I term the "finder," taking care to keep it clear of the engraving-wheel. At the same time the operator, with his right hand applied to the handle N, raises or lowers the table until one of the scratches on the vessel coincides with the point of the finder. This will be very accurately indicated by sound as well as sight, and will determine the proper vertical adjustment of the platform when the vessel is applied to the engraving-wheel in such a manner that the proper graduation-line will be cut thereon, after which another vertical adjustment to an extent determined by another scratch on the vessel in connection with the finder must be made and the vessel again applied to the edge of the engraving-wheel, and these operations are continued until all the graduations determined originally by the scratches have been engraved on the vessel.

Many graduated vessels have two scales precisely alike—one on one side and the other on the opposite side of the vessel—the graduations of one scale affording sighting-lines for those of the other, so that accurate measurements may be made of liquids introduced into the vessel by noting the level of the liquid in connection with the graduations of the two scales.

It is important that the graduations of the two scales should be precisely alike, each line of one scale being in the same horizontal plane as the corresponding line of the other scale, and all the lines of the scales being parallel with each other, and this must necessarily be the case when the lines are engraved in the manner and by the mechanism described above, for the platform A having a true and perfectly horizontal upper surface, and the vessel being always maintained in contact with this surface during the above operations, the lines of the two scales cut by the wheel after the adjustment of the platform must necessarily bear the proper accurate relation to each other.

The preliminary scratches made by the diamond are removed by the engraving-wheel if the work is properly done, and should one or more of these scratches appear on the vessel after the lines have been engraved, it will be a certain indication that there has been an error in executing the work, and the vessel can be accordingly rejected as inaccurate.

The horizontal platform A may be fixed and the engraving-wheel and finder admit of being vertically adjusted, for instance, by a rack on the stand F and a pinion, $x$, carried by a spindle, $z$, having its bearings in the bracket H', which is arranged to slide on the stand I', as shown in Figs. 5 and 6. I however much prefer to make the platform adjustable in the manner described.

It is important that the finder should be vertically adjustable, for the edge of the engraving-wheel, when worn by long use, may demand nice adjustments of the finder.

I claim as my invention—

1. The combination of a horizontal platform, A, with an engraving-wheel, $m$, and a finder, $w$, and with mechanism for the vertical adjustment of the platform or of the wheel and finder, substantially as set forth.

2. The combination of an engraving-wheel with a finder vertically adjustable in respect to the cutting-edge of the wheel.

3. The combination of an engraving-wheel having journals adapted to fixed bearings, and a finder, $w$, with a horizontal platform, A, a driving-shaft, M, and hand-wheel or handle attached thereto, and intervening mechanism whereby the said platform may be adjusted by turning the said shaft M, substantially as described.

4. The combination of the engraving-wheel and finder with the platform A, its threaded stem $a$, guides for the same, and the nut G, substantially as described.

In testimony whereof I have signed my name to this specification in the presence of two subscribing witnesses.

RICHARD M. ATWATER.

Witnesses:
HARRY DRURY,
HENRY HOWSON, Jr.